July 16, 1935.  H. N. ENSIGN ET AL  2,008,439
METHOD OF AND APPARATUS FOR MOVING FILM STRIPS THROUGH LIQUID BATHS
Filed July 17, 1933   2 Sheets-Sheet 1
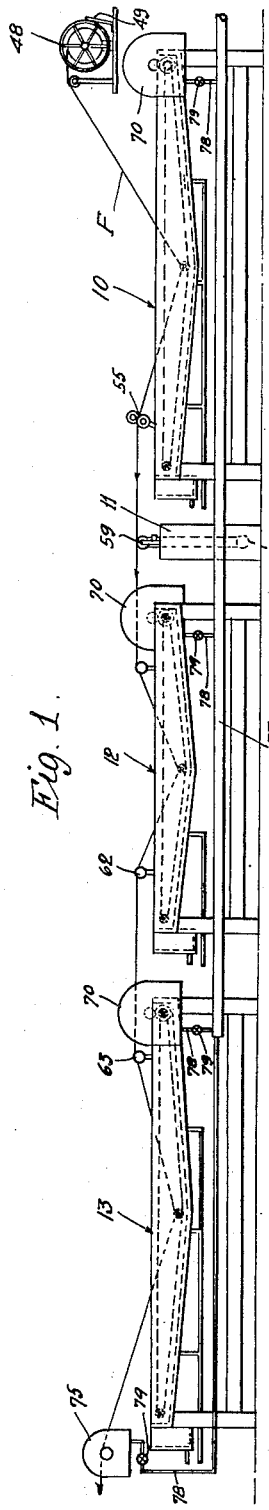
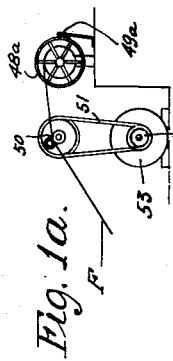
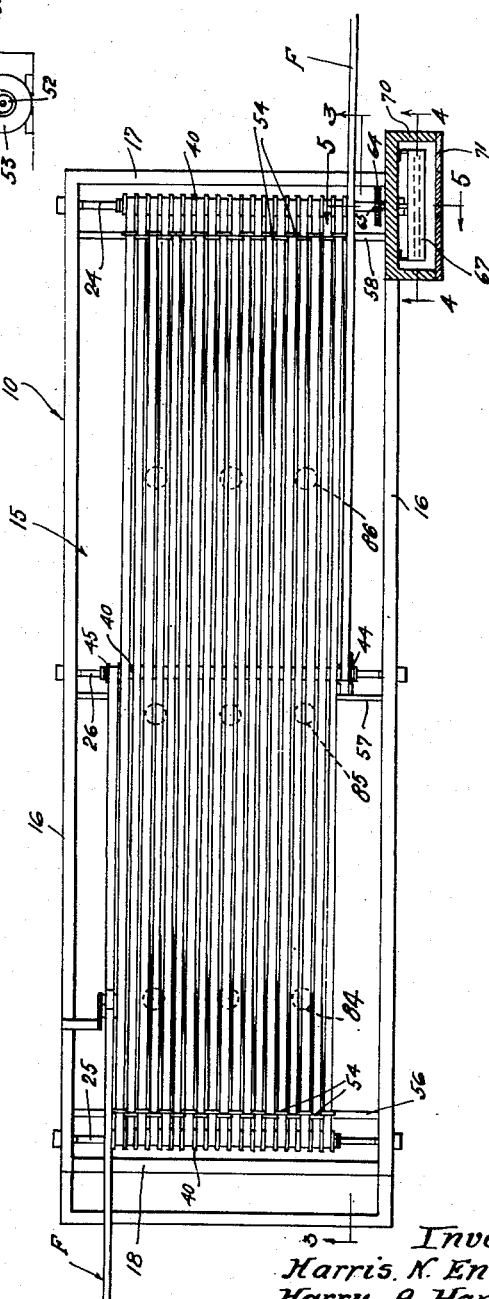
Inventors
Harris N. Ensign
Harry A. Hanson
Attorney July 16, 1935. H. N. ENSIGN ET AL 2,008,439
METHOD OF AND APPARATUS FOR MOVING FILM STRIPS THROUGH LIQUID BATHS
Filed July 17, 1933  2 Sheets-Sheet 2

Inventors
Harris N. Ensign
Harry A. Hanson

Attorney

Patented July 16, 1935

2,008,439

UNITED STATES PATENT OFFICE 2,008,439

METHOD OF AND APPARATUS FOR MOVING FILM STRIPS THROUGH LIQUID BATHS

Harris N. Ensign, Los Angeles, and Harry A. Hanson, West Los Angeles, Calif., assignors to Paramount Productions, Inc., Los Angeles, Calif., a corporation of Delaware Application July 17, 1933, Serial No. 680,769

16 Claims. (Cl. 95—94)

This invention relates generally to the art of moving long strips as motion picture film through liquid baths, and the invention is concerned, in its specific aspect relating to motion pictures, with improvements in methods and apparatus for treating motion picture film strips with developer, hypo, washes, etc.

Motion picture film is ordinarily developed and fixed by continuously moving it longitudinally through successive tanks containing the usual treating liquids, and then finally through a drier. There is a well known phenomenon that occurs in the developing of motion picture film, sometimes described as "streaking" which appears when the positive film is finally finished as relatively lightened streaks following for a short distance behind dark objects in the developed positive, and sometimes also relatively darkened streaks following for a short distance after extremely light objects in the positive. These streaks extend oppositely to the direction in which the film strip was moved through the liquid in the developing process, and whatever the explanation may be, it is evident that the phenomenon is caused when there is relative motion between the film strip and the liquid in the developing operation.

It is accordingly an object of this present invention to provide a method and means for developing motion picture film strips which will avoid such streaking effects.

As is well known in the art, there are many difficult problems involved in moving a film strip successively through liquid baths and a drier, due to the fact that the film in the wet end of the system is constantly expanding while the film in the dry end is undergoing a corresponding shrinkage, so that elongation and shrinkage must be contended with in the same travelling film strip. Numerous schemes for compensating these conditions have been put into use, with varying degrees of success. It will be unnecessary, however, to describe here the various types of prior developing equipment and their advantages and disadvantages, since they are well understood by those skilled in the art.

A further object of the present invention, however, may be stated to be to provide an improved simplified driving system for moving film strips through liquid baths.

These objects are accomplished by our invention, speaking generally, in the following manner: To avoid streaking effects caused by relative motion between the film strip and the developer solution, the developer solution is initially discharged into the developer tank in a direction to move along with the film strip, and the skin friction drag of the film strip keeps the velocity of the liquid up and causes it to move along apace with the film strip. In the form of the invention here illustrated, the film strip is threaded over film rollers in a series of adjacent convolutions. Developer solution is initially introduced to the tank so as to flow with the direction of motion of the film strands of the adjacent convolutions, and its velocity is kept up in a path following said convolutions by the frictional drag of the film.

As a preferred means for moving the film through the tank there are shown smooth drive rollers driven by air turbines, and there may be a constant speed feed at the ingoing end and a slightly over-driven frictional take-out means at the outcoming end. Or these provisions at the ingoing and outcoming ends may be reversed, a frictional hold-back being used at the ingoing end, it being appreciated in the art that the two arrangements mentioned are substantially equivalent. Other suitable variations in the driving means are indicated hereinafter. The nozzles of the air driven turbines are preferably adjusted simply by means of hand valves to give the required drive of the film rollers, although of course such manual operation is not restrictive on the invention.

The invention will be best understood by referring now to the following detailed description of a present preferred embodiment thereof, reference for this purpose being had to the accompanying drawings, in which:

Fig. 1 is a side elevational view showing developer, hypo and wash units arranged in accordance with our invention;

Fig. 1a is a view showing a variational means for feeding film to the developer unit of Fig. 1;

Fig. 2 is a plan view of one of the units shown in Fig. 1;

Figure 3:
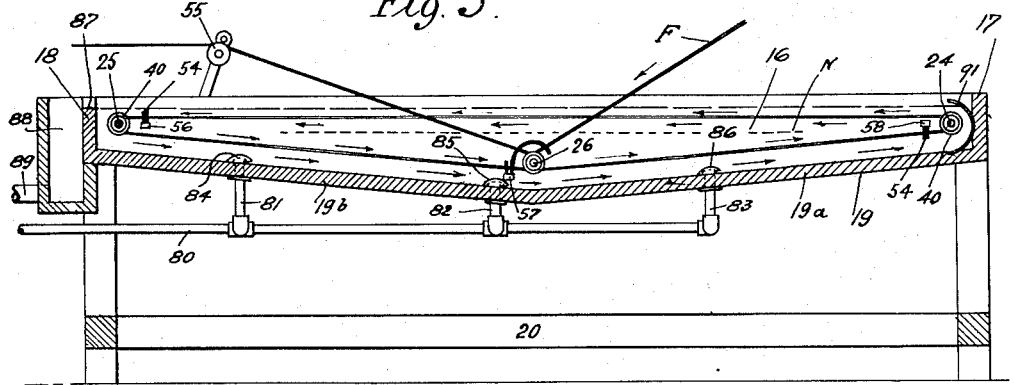
Fig. 3 is a vertical section taken on line 3—3 of Fig. 2.

In Fig. 1 the film F is shown passing successively through a developer unit 10, a rinse tank 11, a hypo unit 12 and a wash unit 13, the film thence going to the usual drier, not shown. The several units 10, 12 and 13 may be exactly similar except that their size may vary in accordance with the proper lengths of treatment required in the several baths. A description of the developer unit 10 therefore suffices for description of units 12 and 13 as well.

Referring now to Figs. 2 to 6, inclusive, it will be seen that unit 10 comprises a tank 15, having sides 16, front and rear ends 17 and 18, respectively, and a bottom 19. Bottom 19 comprises bottom portions 19a and 19b sloping downwardly from ends 17 and 18 towards the middle, for instance as shown in Fig. 3, the purpose of this angular or sloping bottom being made apparent hereinafter. The tank is shown supported above the floor by under framing 20.

Mounted in side walls 16 adjacent tanks ends 17 and 18 are horizontal film roller shafts 24 and 25, and mounted lower than shafts 24 and 25, in the center of the tank just above the angle of the tank bottom, is a third horizontal film roller shaft 26, said three shafts being located in the tank so as to define an inverted isosceles triangle the two equal legs of which are adjacent and parallel to the two sloping tank bottom portions 19a and 19b.

Figure 5:
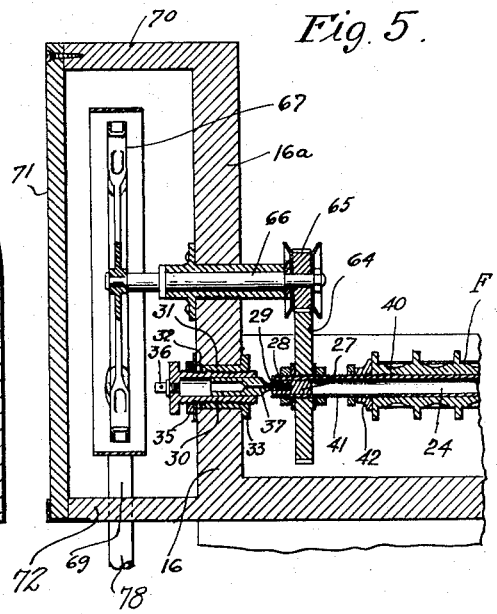
Fig. 5 is a vertical detailed section taken on line 5—5 of Fig. 2.
Figure 6:
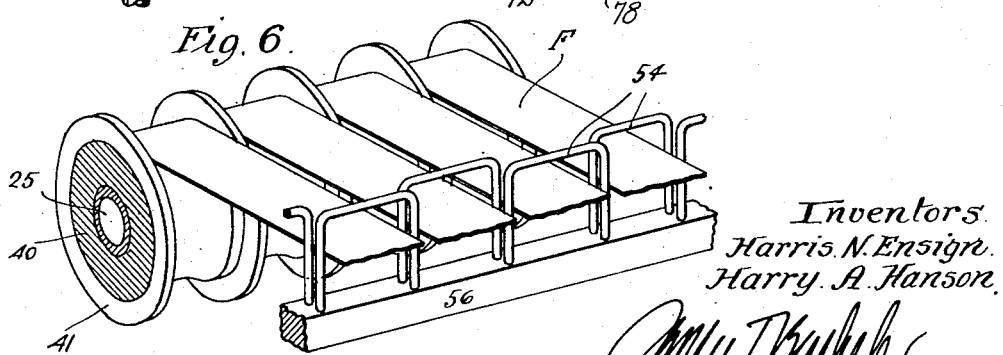
Fig. 6 is a detailed perspective showing film guides employed adjacent the film rollers.

The mounting of one of the shaft ends is shown in detail in Fig. 5. It will be seen that the shaft ends terminate short of the side wall 16 of the tank, and the mounting of the shaft ends on the side wall is such as to enable the shaft to be lifted out of the tank by a comparatively simple manipulation. The shaft here shown is hollow and has bearing plugs 27 force fitted within its ends. Each of these bearing plugs has an inwardly extending axial bore 28 which receives the outer reduced end of a spindle 29, plug 27 having a running fit on spindle 29. Spindle 29 has a force fit within a hollow exteriorly screw threaded bushing 30 which extends through wall 16 and which is screw threaded within an internally screw threaded bushing 31 fitted within a bore 32 in wall 16. Bushing 31 is inserted from the inner surface of wall 16 and has a head 33 that shoulders against said inner wall surface when the bushing is home. Bushing 30, with spindle 29 fitted therewithin, is inserted from the outer side of wall 16 and is screwed into bushing 31 until the reduced outer end of spindle 29 is in proper engagement with the end of shaft 24. A nut 35 on bushing 31 may be set up to clamp the parts in adjusted position. The outer closed end of bushing 30 has a removable plug 36, which is removed to insert lubricant within the hollow of bushing 30. Spindle 29 has an axial passageway 37 adapted to conduct such lubricant to the bearing surfaces between the outer end of the spindle and the bearing bore 28 in the end of shaft 24. It will be evident that this construction enables the shaft bearings to be effectively lubricated, and also enables removal of shaft 24 by simply unscrewing bushing 30 until the outer end of spindle 29 clears the shaft end. This shaft construction and end mounting is preferably used at both ends of each of shafts 24, 25 and 26.

Each of shafts 24, 25 and 26 has mounted thereon, preferably rigidly, a series of smooth film rollers 40, which are preferably formed integral with each other as shown in Fig. 5. For the purpose of setting the rollers rigidly on the shafts, the shaft ends may be screw threaded, as indicated at 41, and nuts 42 may be set up against the ends of the rollers, as clearly shown. As will be noted from Fig. 3, the film roller shafts 24, 25 and 26 are so located that the film strip threaded on the rollers moves in one direction parallel to and comparatively closely adjacent the two oppositely sloping halves of the angular tank bottom, and returns horizontally near the liquid surface in the tank.

The device indicated in Fig. 1 for feeding film F to the developer unit consists of a supply reel 48, provided with a friction drag 49, the feeding device thus constituting what may be termed a friction hold-back feed. In Fig. 1a is shown a variational film feeding arrangement, which is adapted to feed film to developer unit 10 at a constant rate, and which is preferable where the time of treatment in the liquid is of importance, as it is in developing. In this case the film reel 48a feeds the film to a positive feed sprocket 50, which is driven at constant speed to feed film to the developer at a constant rate. Sprocket 50 is shown connected by drive chain 51 to sprocket 52 of a drive motor 53.

In the threading arrangement illustrated, the film strip is brought from the film feeding device downwardly at an angle and around and under one of the outside rollers on central, lower shaft 26, and is then carried backwardly and around and up over the corresponding end roller on forward shaft 24, thence passing horizontally and forwardly to the corresponding end roller on shaft 25 at the other or rear end of the machine, around and under said roller, from there backwardly and under the second roller on central shaft 26, thence on to pass under and around the second roller on forward shaft 24, and so on in successive adjacent convolutions to the other side of the machine. The rollers 40 on the three shafts are of course properly staggered in the usual manner. The film strip is finally brought out of the machine at the point where it passes under the end roller on center shaft 26, being brought up and around said roller and turned again in a forward direction to pass between idler rollers 55 and thence forwardly to the next unit. Of course, the specific threading arrangement described is not limitative on the invention, it being characteristic of the present specific embodiment of the invention, however, that the film passes through the tank in adjacent convolutions. Preferably, guide means are provided for confining the film strip on the rollers. For instance, guide wires 54 mounted on cross strips 56, 57 and 58 (see Figs. 3 and 6) placed just ahead of the roller shafts 24, 25 and 26 serve to guide the film strip as it moves onto the rollers and prevents it from running over roller flanges 41.

The film strip is shown next to pass through rinse tank 11, passing over upper and lower rollers 59 and 60 mounted therein, and thence over a guide pulley 61 to the hypo unit 12. The hypo unit may be substantially similar to the developer unit 10, with the exception of being perhaps shorter in length since the hypo treatment does not require the film to be immersed for as long a time as is required in the developer.

From the hypo unit the film moves over pulleys 62 and 63 to the wash unit 13, which may be similar to the developer unit 10.

Figure 4:
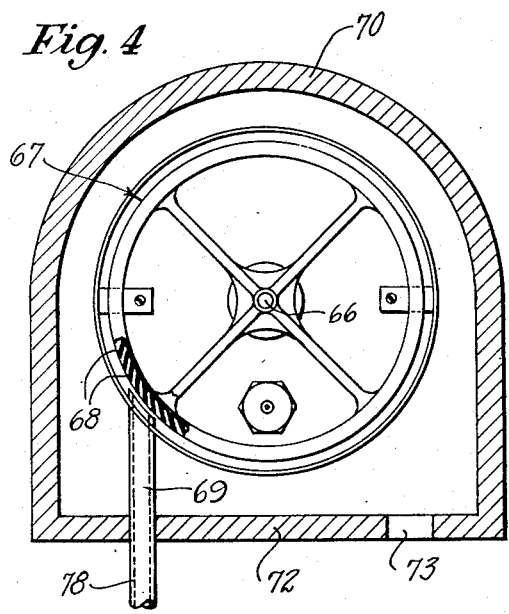
Fig. 4 is a vertical detailed section taken on line 4—4 of Fig. 2.

The film strip is here illustrated as moved through the several units 10, 12, and 13, and also withdrawn from the outgoing end of the last unit 13, by yieldable over-drive devices, adapted to be slightly over-driven in order to keep the film strip sufficiently taut to give proper frictional driving engagement between the film rollers and the film. Preferably air driven turbines, as shown in Figs. 4 and 5, are used for this purpose. As illustrated in said figures, the end of the film roller shaft 24 has mounted thereon a gear 64 meshing with a drive pinion 65 on the inner end of shaft 66 journalled above shaft 24 in vertical side wall extension 16a. On the outer end of shaft 66 is a turbine wheel 67 having usual blades 68, the wheel being driven by air from a nozzle 69. The turbine wheel is enclosed by a suitable case 70 having a removable front wall 71. Lower casing wall 72 has an air exhaust opening 73.

The forward film roller shaft of each of units, 10, 12 and 13 is here shown provided with a turbine drive, as indicated in Fig. 1, and another turbine 75 is utilized to withdraw the film strip from the outgoing end of final unit 13, although this arrangement is not limitative on the invention considered in its broader aspects. Air under suitable pressure is supplied to the several turbines through a header 77 and branch pipes 78 having hand control valves 79.

These air driven turbine wheels thus drive the forward film roller shaft in each of the units, and the final turbine removes the film from the system. The air supply to each turbine wheel is adjusted by means of its individual control valve 79 until the entire system operates with no slippage of the rollers on the film, but with the wet film not so taut as to become unduly stretched and elongated. In the case of a friction hold-back at the beginning end of the system, the film is fairly but not unduly taut between the supply reel and the turbine driven rollers, and the air driven turbine wheel may be held back against the air stream somewhat by reason of the friction hold-back on the film, the relations of the various factors involved being so adjusted that the turbine may be thus held back without unduly stretching the film strip. The turbines accordingly may be considered to function as yieldable, or yieldably driven, film drive devices which yield against their driving force before applying excess force to the film strip. It will be apparent that excess slack is prevented from accumulating in the machine as the film becomes wet and elongates by the friction or yieldable over-drive take-out, which moves such slack forwardly through the machine. (It is obvious that the turbine drive for the second or hypo unit 12 functions as the yieldable over-drive take-out for developer unit 10.)

In the case of a constant speed feed to developer unit 10, as indicated in Fig. 1a, the turbine may be adjusted by means of control valve 79 so as to tend to drive at a speed slightly in excess to that permitted by the constant speed film feed device. The turbines may be adjusted to give but very slight excess force, so that the film, which is wound around the turbine driven rollers in a number of convolutions, will be sufficiently taut that the rollers will not slip on the film, but still will not be unduly strained by the yielding tendency to over-drive. In this case also, the turbine at the beginning end of each succeeding unit functions as the frictional or yielding over-drive take-out for the unit preceding, and takes up any slack due to film elongation. It is found in practice that it is comparatively simple to adjust the turbines to move the film through the several units in succession at constant speed and with the film sufficiently taut that no substantial slippage of the rollers within the film occurs, but still without tensing the film strip sufficiently to permanently elongate it.

While as has been said there is no substantial slippage of the film rollers "forwardly" with reference to the film strip, there may of course occur, when an over-drive take-out is used, some slippage of the film forwardly on the rollers as the film strip elongates and slack tends to accumulate. Or, with a friction hold-back, such slack is taken up by backward slippage of the film. But in normal driving there is no substantial slippage of the rollers within the film. To reduce the amount of slippage of the film on the rollers due to elongation as the treatment proceeds, the film rollers 40 preferably are of increasing diameter from the incoming to the outgoing side of the machine (from left to right looking from the right toward the machine shown in Fig. 2). For instance, the rollers on each shaft may have a progressive increase in diameter from roller to roller of .001". The slack is thereby substantially taken up and corresponding slippage eliminated.

It is of course within the scope of certain aspects of the invention to use any type of film moving arrangements other than that illustrated; for instance, certain of the driven film rollers may be provided with film engaging sprocket teeth, as in various well known types of equipment, in which case the problems incident to film slippage on the drive rollers are eliminated.

We show in the drawings the case wherein the liquid is continuously circulated through each of the several units, that is, continuously introduced to and withdrawn from the units, although in simpler forms of the invention this may not be done, especially in the wash unit. However, continuous introduction and withdrawal of the liquid has numerous important advantages, especially in the developer and hypo units, and is therefore preferred. Fig. 3 shows how the liquid is supplied to and flows through each of the several units in the preferred form of the invention. A developer solution supply pipe is shown at 80, pipe 80 supplying sets of feeder pipes 81, 82 and 83 extending through the tank bottom and leading to transverse rows of jets 84, 85 and 86, respectively, which jets are adjacent the tank bottom and are arranged to discharge liquid therealong in the direction of the forward end of the tank. In the arrangement shown in Figs. 2 and 3 the jets 84 of the first row are near the rear end of the tank and discharge down the slope of, or substantially parallel to, the downwardly sloping bottom portion 19b of the tank, jets 85 of the second row are near or just back of the angle of the tank bottom and discharge also along the tank bottom, and jets 86 of the third row are a distance up the incline of bottom portion 19a and discharge toward the forward end of the tank along and substantially parallel to said bottom portion 19a. Thus the several jets all discharge along and substantially parallel to the bottom portions over which they are arranged and in the direction of the forward end of the tank, which as will appear, is in the direction of movement of the lower sides of film convolutions. The liquid is continuously discharged from the tank by flowing over an overflow edge 87 at the rear end of the tank, said edge being at a level just above the film strands moving rearwardly from the rollers on forward shaft 24 to the rollers on rearward shaft 25. For instance, though without implying any limitation on the invention, the liquid level as determined by overflow edge 87 may be in the neighborhood of three-quarters of an inch above the upper sides of the film convolutions. The liquid overflowing said edge 87 is taken within a tank 88 discharging into a pipe 89.

Movement of the film through the machine is accompanied by a characteristic circulation of the developer liquid rearwardly (to the right in Fig. 3) along the bottom of the tank, and forwardly (to the left in Fig. 3) at the surface to finally discharge over edge 87. This characteristic circulation is accomplished first by the liquid being discharged from jets 84, 85 and 86 directly along the bottom and in the direction of the forward end of the tank, and second by the skin frictional drag on the liquid of the rearwardly moving strands of film on the under sides of the film convolutions. The liquid thus flows in a lower layer moving along the bottom with the film and up the upwardly inclined section 19b of the tank bottom to tank end 17, where it rises and turns backwardly on itself to form a surface layer of liquid moving forwardly in the tank along with the film strands comprising the upper sides of the film convolutions, the liquid being moved thus against its original direction aided by the skin frictional drag of the upper film strands. A curved deflector plate 91 is preferably mounted in the forward end of the tank to aid in turning the rearwardly moving layer of liquid upwardly and back to move forwardly in the tank at the surface. The forward flow at the surface is somewhat aided by the discharge of liquid over the rear end overflow edge 87. Thus there is a layer of liquid moving along with the film toward the right in the bottom of the tank, as viewed in Fig. 3, and another layer of liquid at the surface moving with the film toward the left to finally overflow into discharge tank 88, while at some intermediate neutral level, indicated by the dotted line N, the liquid is relatively quiet as regards flow longitudinally of the tank. It will now be apparent that the "triangular" form of tank and film path gives a separation between the upper and lower sides of the film convolutions and is conductive to establishment of the liquid currents moving in opposite directions at the upper and lower sides of the film convolutions. It will be evident that an increase in sharpness of the angle of the tank bottom (and lower side of the film path) may be made to give increased separation between the upper and lower sides of the film convolutions with resulting advantage in establishment of the characteristic liquid flow, and that any such variation is within the scope of the present invention. Thus it will be seen that the initial direction of the liquid, together with the frictional drag of the convoluted film, causes the liquid to flow along with the film in both the lower and upper sides of its comparatively long convolutions, with the result that comparatively small relative movement occurs between the developer solution and the film strip. In consequence, the previously described "streaking" effect always found when the film strip has substantial movement relative to the developer solution is entirely eliminated.

It will be understood the drawings and description are merely illustrative of and not restrictive of the broader claims appended hereto, for various changes in design, structure and arrangement may be made without departing from the spirit and scope of said claims.

We claim:

1. The method of treating a film strip with liquid, that comprises continuously moving a film strip in a loop-shaped path through a liquid tank, injecting liquid into the tank adjacent and with an initial velocity in the direction of motion of the film strip in one course of said loop-shaped path, and withdrawing liquid from the tank from a point adjacent the film strip in the other course of said loop-shaped path, whereby the liquid is caused to flow along with the film strip in both courses of its loop-shaped path.

2. The method of treating a film strip with liquid, that comprises continuously moving a film strip in a horizontally elongated loop-shaped path through a liquid tank, injecting liquid into the tank adjacent and with an initial velocity in the direction of motion of the film strip in one course of said loop-shaped path, and withdrawing liquid from the tank from a point adjacent the film strip in the other course of said loop-shaped path, whereby the liquid is caused to flow along with the film strip in both courses of its loop-shaped path.

3. The method of treating a film strip with liquid, that comprises moving a film strip in a liquid container successively through two vertically separated courses forming a horizontal extending loop-shaped path, injecting liquid into the container adjacent and with an initial velocity in the direction of motion of the film strip in one course of said loop-shaped path, and withdrawing liquid from the tank from a point adjacent the film strip near the end of the other course of said loop-shaped path, whereby the liquid in the container is divided vertically into two portions flowing in opposite directions with the two courses of the film strip.

4. The method of treating a film strip with liquid, that comprises continuously moving a film strip in a substantially horizontal lower course through a liquid tank and then doubling said film strip over and moving it back on itself in a substantially horizontal upper course above said first mentioned course and near the liquid level in the tank, introducing liquid to the tank adjacent and with an initial velocity in the direction of the lower course of the film strip, and withdrawing liquid from the tank near the liquid level and near the end of the upper course of the film strip, whereby the liquid circulates in the lower portion of the tank in the direction of the lower film course, and moves at the surface in a direction with the upper course of the film strip.

5. The method of treating a film strip with liquid, that comprises continuously moving a film strip in a substantially horizontal lower course through a liquid tank and then doubling said film strip over and moving it back on itself in a substantially horizontal upper course above said first mentioned course and near the liquid level in the tank, and setting up a circulation of the liquid within the tank adjacent the lower course of the film strip in the direction of movement of the film strip portion in said lower course, and of the liquid adjacent the upper course of the film strip in the direction of movement of the oppositely moving film strip portion in said upper course.

6. The method of treating a film strip with liquid, that comprises continuously moving a film strip through a liquid tank in a succession of adjacent convolutions, each of said convolutions comprising a horizontally extending film loop arranged to provide a lower film course and an upper film course, the lower film courses being near the tank bottom and the upper film courses being near the liquid level in the tank, injecting liquid into the tank adjacent and with an initial velocity in the direction of the film moving in said lower film courses, and withdrawing liquid from the tank from a point adjacent the film near the end of said upper film courses, whereby the liquid is caused to flow in the lower portion of the tank in the direction of the film in the lower film course, and to flow at the surface in the direction of the film in the upper film course.

7. In film treating apparatus, the combination of a liquid containing tank, spaced film rollers in said tank adapted to have a film strip supported thereon, means for feeding a film strip onto and moving it around said rollers and for finally withdrawing it therefrom, liquid injection means adapted to inject liquid into the tank adjacent and in the direction of motion of the film strip on said rollers, and means for withdrawing liquid from the tank from a point located in the direction of travel of the film strip from said injection means, all in such manner as to establish a liquid circulation flowing along with the moving film strip.

8. In film treating apparatus, the combination of a liquid containing tank, spaced film rollers in said tank adapted to have a film strip wound therearound in a plurality of adjacent convolutions, means for feeding a film strip onto and moving it around said rollers and for finally withdrawing it therefrom, liquid injection means adapted to inject liquid into the tank adjacent and in the direction of motion of said film convolutions, and means for withdrawing liquid from the tank from a point located in the direction of motion of said film convolutions from said injection means, all in such manner as to establish a liquid circulation flowing along with the moving film strip.

9. In film treating apparatus, the combination of a tank adapted to contain liquid, sets of film rollers in said tank mounted on horizontal axes at opposite ends thereof, said rollers arranged to have a film strip threaded thereon in adjacent convolutions the upper and lower sides of which move in opposite directions, means for moving a film strip around said rollers, means for introducing liquid to the tank adjacent the lower sides of the film convolutions and with an initial velocity in their direction of motion, and means for withdrawing liquid from the end of the tank which is opposite that toward which the liquid is initially injected, all in such manner that injected liquid is caused to flow along with the lower sides of the film convolutions toward one end of the tank and thence to rise, and then to flow along with the upper sides of the film convolutions to the point of liquid withdrawal at the other end of the tank.

10. In film treating apparatus, the combination of a liquid containing tank embodying ends, side walls and a bottom, sets of film rollers in said tank mounted on horizontal axes at opposite ends thereof, said rollers arranged to have a film strip threaded thereon in adjacent convolutions the upper and lower sides of which move in opposite directions, said upper sides being substantially horizontal, and said lower sides being supported comparatively closely adjacent and substantially parallel to the tank bottom, means for moving a film strip around said rollers, means for injecting liquid to the tank between the tank bottom and said lower sides of the film convolutions with an initial velocity in the direction of motion of said lower sides, and means for withdrawing liquid from the end of the tank which is opposite that toward which the liquid is initially injected, all in such manner that injected liquid is caused to flow along with the lower sides of the film convolutions toward one end of the tank and thence to rise, and then to flow along with the upper sides of the film convolutions to the point of liquid withdrawal at the other end of the tank.

11. In film treating apparatus, the combination of a liquid containing tank embodying ends and sides walls and a bottom sloping downwardly from opposite ends towards the middle, sets of film rollers in said tank mounted on horizontal axes at opposite ends thereof, said rollers arranged to have a film strip threaded thereon in adjacent convolutions the upper and lower sides of which move in opposite directions, said upper sides being substantially horizontal, additional film rollers supporting said lower sides adjacent and substantially parallel to said sloping tank bottom, means for advancing the film around said rollers, means for injecting liquid to the tank between the tank bottom and said lower sides of the film convolutions with an initial velocity in the direction of motion of said lower sides, and means for withdrawing liquid from the end of the tank which is opposite to that toward which the liquid is initially injected, all in such manner that injected liquid is caused to flow along with the lower sides of the film convolutions toward one end of the tank and thence to rise, and then to flow along with the upper sides of the film convolutions to the point of liquid withdrawal at the other end of the tank.

12. In film treating apparatus, the combination of a liquid containing tank embodying ends and side walls and a bottom sloping downwardly from opposite ends towards the middle, sets of film rollers in said tank mounted on horizontal axes, two of said axes being at opposite ends of said tank and on the same level and one of said axes being intermediate and lower than said first mentioned axes, said rollers arranged to have a film strip threaded thereon in adjacent convolutions the upper sides of which pass substantially horizontally between the rollers on the two end axes and the lower sides of which pass between the rollers on said end axes below the rollers on the relatively lower intermediate axis, whereby said lower sides are supported substantially parallel to and adjacent the sloping tank bottom, means for advancing the film strip around said rollers, means for injecting liquid to the tank between the tank bottom and the lower sides of the film convolutions with an initial velocity in the direction of motion of said lower sides, and means for withdrawing liquid from the end of the tank which is opposite that toward which the liquid is initially injected, all in such manner that injected liquid is caused to flow along with the lower sides of the film convolutions toward one end of the tank and thence to rise, and then to flow along with the upper sides of the film convolutions to the point of liquid withdrawal at the other end of the tank.

13. In film treating apparatus, the combination of a liquid containing tank embodying ends and side walls and a bottom sloping downwardly from opposite ends towards the middle, sets of film rollers in said tank mounted on horizontal axes, two of said axes being at opposite ends of said tank and on the same level, and one of said axes being intermediate and lower than said first mentioned axes, said rollers arranged to have a film strip threaded thereon in adjacent convolutions the upper sides of which pass substantially horizontally between the rollers on the two end axes and the lower sides of which pass between said rollers on said end axes below the rollers on the relatively lower intermediate axis, means for advancing the film strip around said rollers, means for injecting liquid to the tank adjacent the lower sides of the film convolutions and with an initial velocity in their direction of motion, and an over flow edge at the end of the tank which is opposite that toward which the liquid is initially injected, said edge establishing the liquid level in the tank just above the upper sides of said film convolutions, all in such manner that injected liquid is caused to flow along with the lower sides of the film convolutions toward one end of the tank and thence to rise, and then to flow along with the upper sides of the film convolutions to the over flow edge at the other end of the tank.

14. In film treating apparatus, the combination of a liquid containing tank embodying ends, side walls and a bottom, sets of film rollers in said tank mounted on horizontal axes at opposite ends thereof, said rollers arranged to have a film strip threaded thereon in adjacent convolutions, the upper and lower sides of which move in opposite directions, means for moving a film strip around said rollers, means for injecting liquid into the tank adjacent the lower sides of the film convolutions and with an initial velocity in their direction of motion, and an over flow edge at the end of the tank which is opposite that toward which the liquid is initially injected, said edge establishing the liquid level in the tank just above the upper sides of said film convolutions, all in such manner that injected liquid is caused to flow along with the lower sides of the film convolutions toward one end of the tank and thence to rise, and then to flow along with the upper sides of the film convolutions to the over flow edge at the other end of the tank.

15. In film treating apparatus, the combination of a liquid containing tank embodying ends and side walls and a bottom sloping downwardly from opposite ends towards the middle, sets of film rollers in said tank mounted on horizontal axes, two of said axes being at opposite ends of said tank and on the same level and one of said axes being intermediate and lower than said first mentioned axes, said rollers arranged to have a film strip threaded thereon in adjacent convolutions the upper sides of which pass substantially horizontally between the rollers on the two end axes and the lower sides of which pass between the rollers on said end axes below the rollers on the relatively lower intermediate axis, whereby said lower sides are supported substantially parallel to and adjacent the sloping tank bottom, means for advancing the film strip around said rollers, means for injecting liquid to the tank between the tank bottom and the lower sides of the film convolutions with an initial velocity in the direction of motion of said lower sides, and means for withdrawing liquid from the tank near the liquid level in the tank and from a point in the tank which is remote from the tank end toward which the liquid is initially injected, all in such manner that the injected liquid is caused to flow along with the lower sides of the film convolutions toward one end of the tank, and thence to rise and flow along with the upper sides of the film convolutions toward the opposite end of the tank.

16. In film treating apparatus, the combination of a liquid containing tank embodying ends, side walls and a bottom, sets of film rollers in said tank mounted on horizontal axes, two of said axes being at opposite ends of said tank and on the same level and one of said axes being intermediate and lower than said first mentioned axes, said rollers arranged to have a film strip threaded thereon in adjacent convolutions the upper sides of which pass substantially horizontally between the rollers on the two end axes and the lower sides of which pass between the rollers on said end axes below the rollers on the relatively lower intermediate axis, means for advancing a film strip around said rollers, means for injecting liquid to the tank adjacent the lower sides of the film convolutions and with an initial velocity in the direction of motion of said lower sides, and means for withdrawing liquid from the end of the tank which is opposite that toward which the liquid is initially injected, all in such manner that injected liquid is caused to flow along with the lower sides of the film convolutions toward one end of the tank and thence to rise, and then to flow along with the upper sides of the film convolutions to the point of liquid withdrawal at the other end of the tank.

HARRIS N. ENSIGN.
HARRY A. HANSON.